United States Patent [19]

Ono et al.

[11] Patent Number: 4,832,246
[45] Date of Patent: May 23, 1989

[54] AUTOMATIC SOLDERING MACHINES

[76] Inventors: Harry Ono, 1890 Big Ben Dr., Des Plaines, Ill. 60016; Howard Hieshima, 7432 North Wolcott, Chicago, Ill. 60626; Robert Meixner, 5409 Harvard Ter., Skokie, Ill. 60077

[21] Appl. No.: 262,190

[22] Filed: Oct. 19, 1988

Related U.S. Application Data

[63] Continuation of Ser. No. 102,398, Sep. 29, 1987, abandoned, which is a continuation-in-part of Ser. No. 925,502, Oct. 29, 1986, abandoned.

[51] Int. Cl.[4] ............................ B23K 3/00; B23K 3/06
[52] U.S. Cl. ...................................... 228/1.1; 228/14; 228/35; 228/45; 228/52; 228/56.3; 228/8; 228/15.1; 228/41
[58] Field of Search ...................... 228/1.1, 8, 13, 14, 228/15.1, 35, 41, 45, 51, 52, 56.3

[56] References Cited

U.S. PATENT DOCUMENTS

| | | |
|---|---|---|
| 802,443 | 10/1905 | Cerruti . |
| 2,324,973 | 7/1943 | Young . |
| 2,771,852 | 11/1955 | Iles . |
| 3,282,491 | 11/1966 | Wallace . |
| 3,673,681 | 7/1972 | Steranko ............... 228/4.5 |
| 3,797,725 | 3/1974 | Mori et al. ............. 228/52 |
| 3,812,581 | 5/1974 | Larson et al. .......... 228/13 |
| 3,923,002 | 12/1975 | Vanyi .................... 228/22 |
| 3,940,046 | 2/1976 | Fern ...................... 228/41 |
| 4,108,181 | 8/1978 | Saliaris ................. 228/51 |
| 4,166,562 | 9/1979 | Keizer et al. ......... 228/5.1 |
| 4,493,449 | 1/1985 | Kleiman ............... 228/41 |

FOREIGN PATENT DOCUMENTS 2427390 1/1975 Fed. Rep. of Germany ........ 228/41

Primary Examiner—Nicholas P. Godici
Assistant Examiner—Samuel M. Heinrich
Attorney, Agent, or Firm—Hill, Van Santen, Steadman & Simpson

[57] ABSTRACT

An automatic spot soldering machine incorporates apparatus for automatically sequencing through operations for forming soldered joints at a predetermined position. The sequence includes preforming a quantity of solder from a length of solder wire and positioning it on the joint, and lowering a soldering iron into position for a predetermined period of time. The solder wire is advanced and retracted by a reversible clutch incorporating a rotatable disk and a concentric clamping ring.

24 Claims, 2 Drawing Sheets

AUTOMATIC SOLDERING MACHINES

BACKGROUND

This is a continuation of application Ser. No. 102,398, filed Sept. 29, 1987, now abandoned, which is a continuation-in-part of my pending application Ser. No. 925,502, filed Oct. 29, 1986, now abandoned.

The present invention relates to an automatic spot soldering machine, and more particularly to an automatic soldering machine usable for assembly operations of components such as PC boards, electrical terminals, and the like.

A number of attempts to develop automatic spot soldering equipment have been made in the past, but these attempts have not been entirely successful. Several different operations must be handled in the correct order, and in the correct timing, and the apparatus available in the past has not successfully integrated all of the required operations. According, it is desirable to produce an improved automatic soldering, apparatus in which all of the necessary operations are carried out with the correct sequence and timing.

SUMMARY OF THE INVENTION

In accordance with one embodiment of the present invention, there is provided a mechanism for supporting a soldering iron in vertically movable condition, a mechanism for automatically feeding solder having a flux core to a position directly beneath the movable iron, a mechanism for supplying solvent, and a mechanism for receiving the solvent and for automatically cleaning the tip of the soldering iron to remove undesirable oxides and the like.

In a specific embodiment of the present invention, there is provided preforming apparatus fcr preforming the solder to be used, solder transport apparatus for transporting the solder to the place where it is needed and for breaking off a quantity of solder as needed, a vertically movable soldering iron adapted to engage the solder and the parts to be soldered, apparatus for lowering the soldering iron into soldering position, a damper for regulating the speed of movement of the soldering iron, a cover for normally enclosing the tip of the soldering iron for surrounding it with an inert atmosphere, a brush for selectively cleaning the soldering iron, brush drive apparatus for selectively moving the brush into contact with the soldering iron tip, and solvent dispensing apparatus for applying solvent to the brush. In operation, the components work together in sequence and in cooperation to provide solder joints with maximum efficiency.

In another embodiment, apparatus is provided for controlling the soldering iron spindle velocity and pressure, using a spring loaded solder tip spindle that is free of friction and adjustable in pressure to provide a fast consistent motion of the solder iron. A linkage arrangement for the movement of a solder wire guide tube provides an accurate method for transferring the solder from the preformer position to the soldering position, pivoting about a feed mechanism pivot location to minimize inertial forces and to permit a faster cycle time. A feed roller pressure mechanism permits the use of a pair of smooth, round elastomer rollers. A clutch mechanism which is light weight provides forward, reverse and neutral movements, with adjustments for the solder supply stroke lengths. An oscillator for the solder tip spindle provides agitation of the molten solder, to improve distribution and adhesion of the solder on the work pieces. A short cycle mode of operation is provided, which allows rapid multiple cycles for soldering of multiple positions in rapid sequence.

BRIEF DESCRIPTION OF THE DRAWINGS

Reference will now be made to the accompanying drawings in which.

DESCRIPTION OF THE PREFERRED EMBODIMENT

Figure 1:
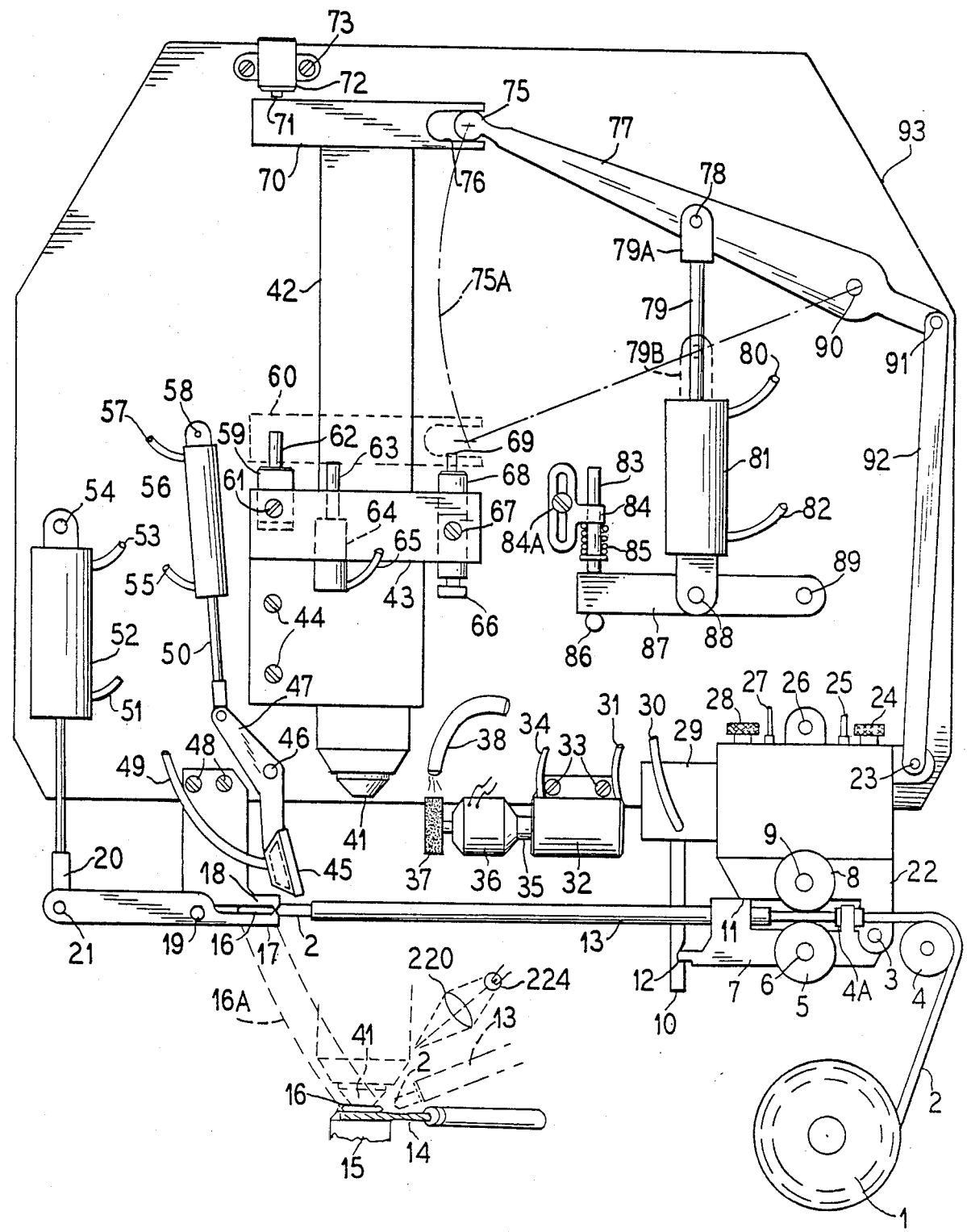
FIG. 1 is a diagrammatic illustration of a preferred embodiment of the present invention.

Referring now to FIG. 1, a wire 14 to be soldered to a terminal strip 15 or the like, is illustrated with a pellet of solder 16 which has been performed from the end of the solder wire 2 prior to the downward movement of the solder tip 41.

The solder tip 41 is mounted on a spindle 42, and supported to move vertically, guided by spindle bearing block 43, which in turn is mounted on the machine frame 93 with two bolts 44.

The top end of the spindle 42 contains a rigidly attached cross plate 70, having a groove 76 to engage the end 75 of an actuating lever 77. The actuating lever 77 is pivotally mounted by a shaft 90 on to the frame 93.

A double acting air cylinder piston 79 is connected to the lever 77 by means of a pivot pin 78. The air cylinder 81 is connected to a cross lever 87 which is pivotally mounted to frame 93 via a shaft 89.

The lever 87 rests on a stop pin 86, and is depressed downwardly by the spring plunger 83. The spring 85 is compressed by the bracket 84, which is adjustably mounted on to frame 93 with a bolt 84A. When the cylinder 81 is actuated to retract the piston 79, the lever 87 is pivoted upwardly, compressing a spring 85. Thus, the spring 85 determines the force with which the soldering iron tip 41 bears on the parts to be soldered. The amount of this force is adjustable by adjusting the position of the bracket 84, with the bolt 84A, to allow more or less compression of the spring 85.

The feeder block 22 is pivotally mounted to the frame 93 by a shaft 26, and is connected to the actuating lever 77 with a tie rod 92.

The upper feed roller 8 is mounted on a shaft 9 which is rotatably mounted on a feeder block 22. A lower feeder assembly plate 7 is hinged onto feeder block 22 with a cross shaft 3.

The lower feed roll 5 is mounted onto a shaft 6 which is rotatably mounted on a feeder assembly plate 7. Feed roll shafts 6 and 9 are connected with a pair of gears (not shown) which rotate both rollers 5 and 8 in unison.

Also mounted on the plate 7 are a solder guide tube 13 and a latch 12, which engages a notch in the piston shaft 10 of air cylinder 29, to provide the clamping force for the feed rollers 5 and 8.

The air cylinder 29 is a single acting unit mounted on the feeder block 22.

An air cylinder 32 is mounted on the frame 93 with two bolts 33. The piston rod 35 of this cylinder functions as a mount for an electric motor 36. A brush 37 is mounted onto the shaft of the electric motor 36, and is rotated by the motor.

A solder tip cover 45 is pivotally mounted onto the frame 93 by a shaft 46 mounted on the frame 93. This cover 45 is actuated with a double acting air cylinder 56, which is mounted on the frame 93 by a pivotal shaft 58. A nitrogen supply hose 49 is connected to the cup 45, to furnish nitrogen or other inert gas to the cup.

A preformer upper jaw 18 is mounted on the frame 93 with two bolts 48. A lower jaw 17 is pivotally mounted onto the upper jaw plate 18 via a shaft 19. The lower jaw 17 is connected to the piston rod 20 of a double acting air cylinder 52 with a pin 21. The air cylinder 52 is pivotally supported by the frame 93 with a shaft 54. The solder wire 2 is scored by a stamping action between the jaws 17 and 18, to define the pellet 16.

The spindle bearing block 43 also functions as a mount for hydraulic dampers 59 and 68 and for a vibrator or oscillator 64.

Another hydraulic damper 72, which is mounted onto frame 93 with bolts 73 and bears on the upper arm 70 of the spindle, cushions the spindle assembly 42 at the end of its upward motion.

Figure 2:
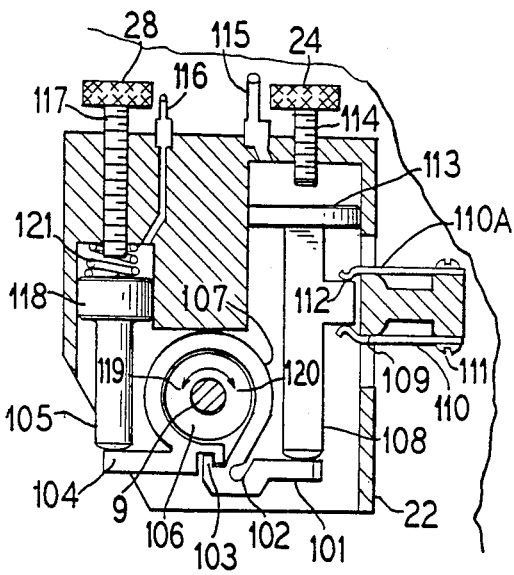
FIG. 2 is a vertical cross sectional view of a portion of the apparatus of FIG. 1.

As shown in FIG. 2, a drive mechanism for the feed roll shaft 9, which rotates the feed roll 8, is illustrated. The drive has forward, reverse and neutral movements with means for adjusting the reverse and forward rotation.

A clamping ring 107 is circumferentially positioned surrounding the periphery of a disk 106, which is rigidly attached to the roller feed shaft 9. A small clearance is provided between the clamping ring 107 and the disk 106. This clearance allows the shaft 9 to freely rotate whenever pistons 118 and 113 are non-pressurized, i.e., in their upper positions.

Pistons 118 and 113 have piston rods 105 and 106 which are in contact with levers 104 and 101. The levers 104 and 101 are rigidly connected with the ring 107, and are preferably integrally formed therewith. Piston 113 has a lobe 112 which is in contact with springs 110 and 110A. The springs 110 and 110A are rigidly mounted on housing 22 and rest on a stop 109.

An interlocking tongue and groove 103 formed as part of the ring 107 is positioned to provide a clamping action when levers 104 and 101 are slightly deflected downwardly. The narrow section 102 on ring 107 is positioned to allow the part 101 to pivot as a lever about the ring hand side of the spring 107, so as to amplify the force applied to the lever 101, and tighten the ring into engagement with the disk 106.

A pair of stops 114 and 117 are attached to external knobs 28 and 24, whereby the positions of the stops are adjustable.

Air supply lines 115 and 116 actuate the pistons 113 and 118.

A set of conventional solenoid-operated pneumatic values (not shown) provide pressurized air to the various cylinders in the proper sequence for the appropriate durations. These valves are electrically controlled by a conventional controller unit which is readily available.

The operation of the apparatus may be initiated by means of a signal developed by a foot pedal or a manually operated switch. The signal is supplied to the controller, so that the sequence can begin.

When the cycle initiates, the cover 45 is opened, under control of the air cylinder 56. This uncovers the soldering iron tip 41. Then the spindle 42 moves downwardly, under the control of the air cylinder 81, through the lever arm 77 and the yoke 76. When the block 70 reaches the damper 59, the downward motion of the spindle is slowed, by action of the damper, and when the block 70 reaches a position of the damper 68, it is further slowed by means of the damper 68. The dampers 59 and 68 supply a two stage damping, which is effective to decelerate the rapid downward motion of the soldering iron, so that it is lowered very slowly at the location where it contacts the solder, at the position of the solder joint.

The solder tip 41 presses against the solder pellet 16, supplying heat to it and heat to the parts 14 and 15 which are being soldered. The score line between the solder pellet 16 and the solder wire 2 represents a weakened portion of the solder and constitutes a heat barrier tending to insulate the solder source from the heat of the soldering iron tip.

The solder tip 41 rests against the joint to be soldered for a predetermined time, as controlled by the controller, with a preset force, as controlled by the spring 85.

While the solder tip remains at its lower position, pressing the solder against the joint to be soldered, the feed rolls 5 and 8 are energized, to retract the solder wire 2, causing the pellet 6 to break off the end of the solder wire. The soldering iron is maintained in this lower position for a time sufficient to complete the soldered joint. During this period, the vibrator 64 vibrates the spindle vertically through an actuator arm 63 bearing on the block 70. The vibrator is powered by an air pressure source through a line 65. The vibration agitates the solder, through the soldering iron tip 41, to encourage the solder to flow into the joint being soldered.

After the solder pellet has been broken off, the spindle 42 and interconnected feeder assembly, containing the solder wire feeder tube 13, rapidly pivots upwardly, and is then slowed to a stop by the hydraulic damper 72. Simultaneously, the feed rolls 5 and 8 return to their original position, and then feed forward a predetermined length of solder wire to form the pellet 16 for the next soldering operation.

When the spindle 42 returns to its uppermost position, three operations take place simultaneously. Firstly, the preformer jaws 17 and 18, which had been in the open position, are closed. Secondly, a drop of solvent is applied from a tube 38 onto the rotating brush 37, after which the rotating brush 37 moves forward past the hot soldering iron tip 41, and then returns. Also the cover 45 closes, and the nitrogen flowing through the tube 49 displaces any air from the tip 41, preventing it from oxidizing.

At this point the cycle described above may be repeated. It is understood that between cycles, a positioning device positions a new solder joint at the lower position of the soldering iron 41, so that it is in position at the time at the lowering soldering iron reaches that location.

The normal cycle of operation, described above, requires approximately 0.7 second. However, many solder joints may be indexed into position as fast as 0.1 second. Therefore, for operations involving rapid indexing, manufacturing production rates can be substantially increased by using a shorter cycle. In addition, some soldering locations require more solder than can be provided with a single feed cycle. In this case, the work piece may be held stationary while the apparatus is run through two or more cycles, supplying a greater quantity of solder to the joint.

To accomodate more rapid cycling, a short cycle is provided in which the sequence of operations as follows.

Starting with the soldering iron 41 in its down position, and after the work piece has been wetted with solder, the spindle 42 then moves upwardly for an adjustable time interval, and immediately after the spindle starts up, the feeder feeds out a predetermined length of solder. The delay between the upward movement of the spindle and the operation of the feeder may be, for example, 20 milliseconds. Then the spindle moves downwardly, after the solder has been fed out, and the soldering iron 41 then melts the projecting end of the solder wire 2 and then the retract operates in order to withdraw the unmelted solder wire from the soldering location. The spindle 42 stays in its downward position, until the solder is melted out into the solder joint. Then the operation is repeated for the next solder joint to be formed. The time required for a typical short cycle is on the order of 0.2 seconds.

In order to reduce the cycle time of the apparatus to a minimum, the inertia of the spindle 42, and of the feeder assembly 22 must be kept to a minimum. This allows a high velocity to be achieved. The primary damper 59, which slows the downward movement of the spindle 42, is normally not compatible with the pressure and velocity required at the final approach of the soldering iron tip 41 to the joint to be soldered. This is because the final movement, during melt down of the solder pellet 16, is more precise than can be accomodated by a single damper. Accordingly, the second damper 68, which is adjustable in its damping effect, is positioned to control the final ⅛ inch movement of the spindle 42. In this way, the movement of the spindle 42 is controlled so as to accurately approach and melt the solder pellet to form the solder joint.

Quite often the solder tip 41 presses on the solder pellet 16 (or solder wire end) at an angle, or with a horizontal force perpendicular to the axis of the solder wire 2. This causes the solder wire supply 2 to bend laterally at some point between the solder tip 41 in the down position and the end of the solder wire guide tube 13. If this lateral bend is not straightened out, the lateral position of the solder pellet will be shifted away from the desired position on the next cycle. By providing a close fitting solder guide tube 13 and sufficient pull back movement, the solder wire end 2 is straightened out during each cycle.

To provide the high reverse acceleration for retraction of the solder wire, the low inertia, high force reversible clutch mechanism is provided (FIG. 2). The inertial components of this mechanism are limited to a single friction ring and two pistons.

A fast reversal requires good traction of the feed rolls 5 and 8 on the solder wire 2, and accordingly, the feed rolls 5 and 8 are constructed of high friction elastomer. Soldering alloys will cold flow and flatten if left under even light pressure between the feed rolls 5 and 8. Therefore, the air cylinder 29, actuated by air line 30, is installed to close and clamp the feed rolls 5 and 8 only during actual periods of forward or reverse motion. Previous attempts to eliminate the cold flow problem have employed the use of serrated drive wheels or other devices which have been unsatisfactory because they undesirably score or deform the solder wire.

A fast reversal motion develops into a high reverse velocity which must be terminated. Although the reverse movement is small, the velocity of the retracting solder wire 2 is great enough to cause shaving of the solder wire 2 surface due to the stopping force required, if serrated rollers were to be used. Any slippage of the solder wire 2 in a feed mechanism causes inaccuracies of the feed length. Therefore, the feed mechanism requires stopping forces substantially higher than the driving (acceleration) forces, and is accommodated by the mechanism of FIG. 2.

A forward feed cycle of the mechanism of FIG. 2 consists of actuating pistons 118 and 113 simultaneously through air lines 115 and 116. The piston rods 105 and 108 apply a deflection on the levers 104 and 101, which causes a pivotal lever action of the tongue and groove by deflection at point 102. This action decreases the circumference of ring 107 and creates a high friction force on drive disk 106. Since the piston 113 is larger than the piston 118, the differential force becomes the net output torque of shaft 9, which in this sequence rotates shaft 9 in the clockwise direction 120. The release of air pressure on piston 118 first (and then piston 113) allows the pistons 113 and 118 and ring 107 to return to the neutral position, with no further rotation of the shaft 9. The return motion is provided by springs 110 and 121.

At the termination of the forward rotation 120, all of the components are moving at a high velocity. This movement is terminated with an impact of the piston 118 against a stop 117. The high deceleration force required to stop the rotation of disk 106, shaft 9, and the rollers 5 and 8 is provided by the inertia of the piston 113 and the rod 108 which impacts against level 101. The friction force of the ring 107 to disk 106 at the instant of impact is many times greater than the normal accelerating friction force.

The reverse motion requires actuation of the piston 118 with compressed air through a hose 116. The pressure on the lever 101 for the clamping action of the ring 107 is provided by the spring 110A, which also returns the piston 113 to its neutral position. The clamping action is maintained throughout the reverse rotation 119, and subsequent return to the normal position, due to the back pressure of the air exhausting out of piston 118. The deceleration on the reverse motion is with an impact on the adjustable stop 114, which provides a high friction force as described on the forward motion.

In the neutral position the disk 106 and shaft 9 are disengaged from ring 107. This allows hand rotation of feed rollers 5 and 8 for set-ups and threading of new spools of solder wire 2.

The entire feeder assembly of FIG. 2 is pivotally mounted on the plate 93 by a shaft 26. By locating the pivot shaft 26 of the entire assembly, the inertial loads for fast cycling are minimized. The location of the shaft 26 is also essential for minimizing the length of push and pull of the wire 2 out of spool 1 when the feed assembly oscillates through a cycle.

The inertial effects of a rotating body (such as the feeder assembly) is a function of the square of the radius. Therefore, in consideration of the inertial effects and the pushpull action of the wire supply 2, it is desirable to locate the pivot 26 close to the feed rolls 5 and 8 and within 50% of the length from the feed rolls 5 and 8 and jaws 17 and 18.

The feeder housing 22 (and associated assembly) is connected to synchronously oscillate with the spindle 42, by means of a tie rod 92. By mechanically interlocking both movements, in contrast to an independently powered feeder assembly, a substantial simplification of the movement mechanisms, and a faster cycle time is made possible.

After the solder pellet 16 melts out, the solder tip 41 sits on a pool of molten solder until the work pieces 14 and 15 are wet out. During this interval, contaminants such as air bubbles, oxides, excess flux, amalgamates, etc. can interfere with the flow of the molten solder 16 and the heat transfer of the heat from the solder tip 41 to the work pieces 14 and 15. It is desirable at this time to agitate the molten solder 16 and the work pieces 14 and 15 to allow the contaminants to move and work their way out of the solder joint area.

The spindle oscillator 64 is mounted on spindle bearing block 43. The piston rod 63 of the oscillator contacts the spindle cross member 70, in its lower position, and by pulsing compressed air into air hose 65 the spindle 42 and hot solder iron 41 is vibrated vertically with a small amplitude, such as 0.010 inch at 10 cycles per second. Alternatively, a low frequency ultrasonic unit mounted below the work piece 14 and 15 or on the solder tip 41 could be used to promote good solder flow.

It is desirable to feed out the solder wire 2 during the upward return of the spindle 42, and to perform the preforming operation immediately after the spindle returns to its normal up position. This sequence will provide the maximum cycle speed because the indexing of the work pieces 14 and 15 may proceed while the brush 37 and preform operations are under way. As soon as the new work pieces 14 and 15 are in position, the solder tip 41 and solder pellet 16 (which has been preformed on the previous cycle) may be lowered to proceed with the soldering.

The brushing operation, which occurs after each soldering is completed, removes contaminants, flux that adheres to the tip 41, and excess solder that remains on the surface of the solder tip 41. The removal of excess solder allows an accurate quantity of solder to be deposited on the work piece in preparation for the next cycle. The brushing operation occurs on every cycle. Removal of excess solder adhering on the solder tip 41 substantially reduces the erosion of the surface and the effects of amalgamation. Tests have indicated that solder tip life is as much as eight times greater when this technique is used.

Solvent flow is controlled by a solenoid-operated valve (not illustrated) similar to a conventional air valve. A momentary flow of solvent through the tube 38 during each cycle keeps the brush wetted and clean.

The solder tip cover 45 closes over the solder tip 41 at the end of each cycle. Nitrogen or other inert gases flowing through the tube 49 protects the hot soldering iron 41 from oxidizing and maintains a solder wetted out condition even after long intervals between cycles. It is understood that nitrogen gas may be conserved by stopping the flow during the machine cycling.

The apparatus of this invention may be a self contained unit, designed to be used as part of a high production system or as a bench unit. When used as a bench unit, many applications requiring hand positioning of a part to be soldered, and locating the part to the exact position of the solder tip 41 in the down position, becomes slow and difficult without a suitable spotting device. A number of attempts on this type of operations involved the use of a movable spotting pointer, a partial lowering of the spindle, or an optical sight tube. However, all of these devices interferred with the ease and speed of hand positioning of the work piece.

Figure 3:
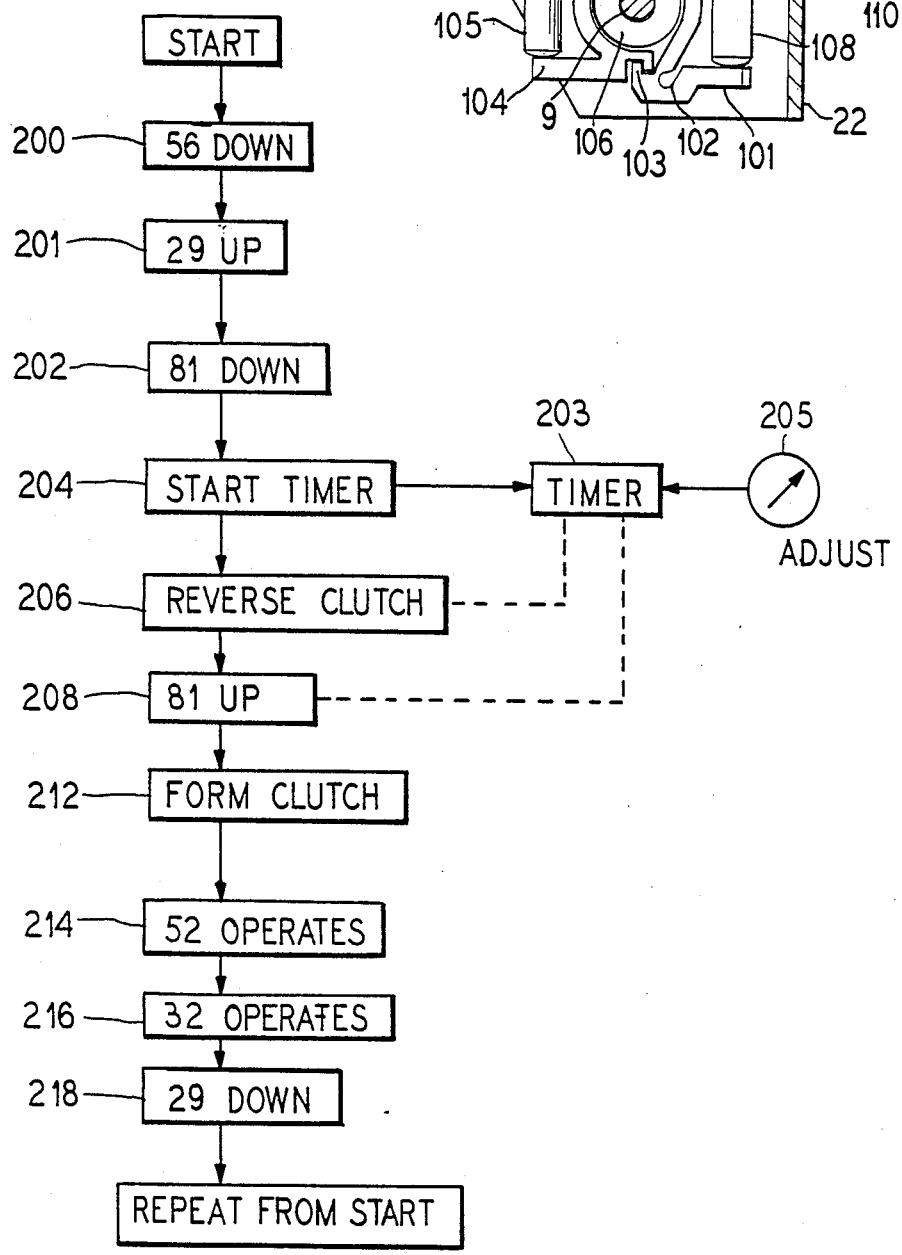
FIG. 3 is a functional block diagram of a control system used with the invention.

FIG. 3 shows a functional block diagram of a controller for controlling the time sequence of various operations. It may be embodied by any of the commercially available controllers whih function to produce a plurality of individual control signals in time sequence, either under control of a self-contained timer, or signals from sensors indicating that necessary prior operations have been completed. On start up, unit 200 energizes air cylinder 56, to lower the cover 45, and unit 201 causes the cylinder 29 to raise the feed roll 5. Then unit 202 lowers the spindle and unit 204 starts the controller's timer 203. Adjustment means 205 allows the timing of the timer to be adjusted. Signals from the timer 203 control the time to pull back the solder (via unit 206) and subsequently to move the spindle back up by operation of unit 208. Then unit 212 feeds the solder forward to the preformer. Then unit 214 preforms the solder, and unit 216 brushes the soldering iron tip. Then unit 218 releases the feed roll 5, the solder down, after which the sequence is repeated, immediately, assuming a new joint to be soldered has been moved into position. This may be verified, for example, by a confirmation signal from the operator to restart the sequence.

For a short cycle, units 200, 210, 214, 216 and 218 are skipped, so that the remaining units, which operate in the same sequence, perform a more rapid operation.

The use of a high intensity, sharp focus light beam eliminates most of the hand positioning problems. When high intensity white light is difficult to differentiate from the environmental light, then a colored light beam, or a pulsating light could be employed instead. FIG. 1 shows such an arrangement using a light source 224 and a focusing lens 220, to focus a bright image of the light source at the location of the joint to be soldered. The operator can tell visually when the joint is in the correct position by observing whether the bright image is focused on the joint.

It is apparent that the air cylinder operated devices may, with additional complexity, be replaced with mechanical linkages, cams and servo motors either partially or in entirety, and that various modifications and additions may be made in the apparatus and methods described above, without departing from the essential features of novelty thereof, which are intended to be defined and secured by the appended claims.

Other advantages of this invention are low maintenance, low cost of fabrication, light weight and compactness. The light weight is essential for a fast acting solder cycle.

What is claimed is:

1. An automatic solder machine comprising a soldering iron tip, means for moving said soldering iron tip relative to a joint to be soldered, a source of solder, means including a solder guide for advancing a quantity of solder from said source to said joint, means for moving said soldering iron tip into contact with said solder, said solder comprising an elongate length of meltable material, and means for retracting said solder toward said source after said tip has been lowered, whereby a quantity of solder is broken or melted from said source of solder, and means for moving said solder guide away from said soldering iron tip.

2. Apparatus according to claim 1, including adjustable timer means for selecting the time interval between contact with said solder by said soldering iron tip, and retraction of said solder from said joint.

3. Apparatus according to claim 1, including stamping means juxtaposed with said source of solder, said stamping means adapted to score said solder at a predetermined position relative to the end of said length of solder, whereby said score line represents a weakened portion of said solder and constitutes a heat barrier tending to insulate the solder source from the heat of said soldering iron tip.

4. Apparatus according to claim 1, including preset adjustable means for lowering said soldering iron tip into proximity with said joint, whereby said soldering iron tip is lowered at a preset speed into juxtaposition with said joint and bears on said joint with a preset force.

5. Apparatus according to claim 4, including means for allowing manual adjustment of the force with which said soldering iron tip bears on said joint.

6. Apparatus according to claim 5, including an adjustable spring for supplying said force.

7. Apparatus according to claim 1, including a two stage damper, the first stage of said damper slowing the initial travel of said soldering iron tip until it comes into proximity with said joint, and said second stage adapted to more greatly slow the speed of said soldering iron tip as it approaches the location of said joint.

8. Apparatus according to claim 7, including adjustment means for regulating the final velocity of said soldering iron tip as it approaches said joint.

9. Apparatus according to claim 1, including a vibrator, said vibrator being mechanically connected to said soldering iron, whereby said solder is subjected to mechanical agitation during melting, connected to means for moving said soldering iron.

10. Apparatus according to claim 9, wherein said vibrator is connected to said means for moving said soldering iron.

11. Apparatus according to claim 1, wherein said means for advancing a quantity of solder comprises a rotational clutch mechanism having a rotatable disk, and a friction ring selectively engaging said disk for selectively applying the energy of rotation of said disk to the advancement of said solder.

12. Apparatus according to claim 11, including lever means for clamping said friction ring to said disk.

13. Apparatus according to claim 12, wherein said lever means incorporates an outwardly extending projection for applying a clamping force to said friction ring.

14. Apparatus according to claim 13, including a plurality of levers extending outwardly from said friction ring in opposite directions and means for bearing on said levers for engaging said clutch in forward and reverse directions.

15. Apparatus according to claim 1, including a close fitting guide tube surrounding said length of solder, whereby the end of said length of solder is straightened as it is withdrawn from said joint.

16. Apparatus according to claim 1, including a control means comprising means for selecting an adjustable time duration for upward and downward movement of said soldering iron tip, whereby a shortened time may be selected for upward movement of said soldering iron tip, and means for advancing said quantity of solder during said spindle movement.

17. Apparatus according to claim 1, including means for brushing said soldering iron tip after each soldering operation.

18. Apparatus according to claim 17, including means for periodically applying solvent to said brush.

19. Apparatus according to claim 1 wherein said means for advancing a quantity of solder comprises a pivotally mounted feeder assembly having a pair of feed rolls, the distance from the pivot axis of said feeder assembly to said feed rolls being less than 50% of the distance from said feed rolls to said joint.

20. Apparatus according to claim 19, including actuating means connected with said means for moving said soldering iron tip, whereby said quantity of solder is advanced synchronously with movement of said soldering iron tip.

21. Apparatus according to claim 1, including means for preforming said quantity of solder while said soldering iron tip is in its position removed from said joint.

22. Apparatus according to claim 1, including a light source, and means for focusing said light source at the position of said joint.

23. Apparatus according to claim 1, including means for surrounding said soldering iron tip with an inert gas.

24. Apparatus according to claim 1, wherein said means for advancing a quantity of solder comprises a pair of feed rollers, said feed rollers being comprised of elastic material, and including means for cyclically opening and closing said rollers relative to said solder.

* * * * *